United States Patent [19]

Johansson et al.

[11] Patent Number: 4,961,222

[45] Date of Patent: Oct. 2, 1990

[54] APPARATUS IN A TELECOMMUNICATION SYSTEM FOR SUPPLYING POWER TO A TELEPHONE SET

[75] Inventors: Hans V. Johansson, Bergshamra; Arne O. T. Rydin, Saltsjöbaden, both of Sweden

[73] Assignee: Telefonaktiebolaget L M Ericsson, Stockholm, Sweden

[21] Appl. No.: 393,007

[22] Filed: Aug. 10, 1989

Related U.S. Application Data

[63] Continuation of Ser. No. 143,165, filed as PCT SE87/00219 on Apr. 28, 1987, published as WO87/07104 on Nov. 19, 1987, abandoned.

[30] Foreign Application Priority Data

May 6, 1986 [SE] Sweden .................................. 8602080

[51] Int. Cl.⁵ ...................... H04M 3/40; H04M 19/08
[52] U.S. Cl. ..................................... 379/413; 379/405
[58] Field of Search .............. 379/345, 400, 399, 405, 379/413, 412

[56] References Cited

U.S. PATENT DOCUMENTS 4,300,023 11/1981 Kelley et al. ......................... 379/405
4,322,586 3/1982 Mein et al. ....................... 379/413 X
4,709,388 11/1987 Defretin ............................... 379/413

Primary Examiner—Jin F. Ng
Assistant Examiner—Randall S. Vaas
Attorney, Agent, or Firm—Burns, Doane, Swecker & Mathis

[57] ABSTRACT

A subscriber line circuit (1) is connected via a subscriber line (3a, 3b) to a telephone set (2). For a raised receiver the subscriber line (3a, 3b) is supplied with a line current (Is) by speech signal amplifiers (4), which are powered from a power source (VBB). The speech signal amplifiers (4) and their power supplying amplifiers (7,9, and 10) have large idling power, apart from the power fed to the subscribe line. To decrease this idling power, the subscriber line circuit (1) has auxiliary amplifiers (5) with low idling power for supplying the subscriber line (3a, 3b) when the receiver is cradled. When a call is in progress and the receiver is lifted, the line current (Is) has a relatively large value, and when the call ceases and the receiver is replaced the line current (Is) decreases. This current decrease is sensed via a resistor (R2) by a loop sensing circuit (13), which sends a signal (S1) to a control circuit (14). The latter then sends signals (S2) and (S3) for connecting the auxiliary amplifiers (5) and disconnecting the speech signal amplifiers (4).

2 Claims, 1 Drawing Sheet

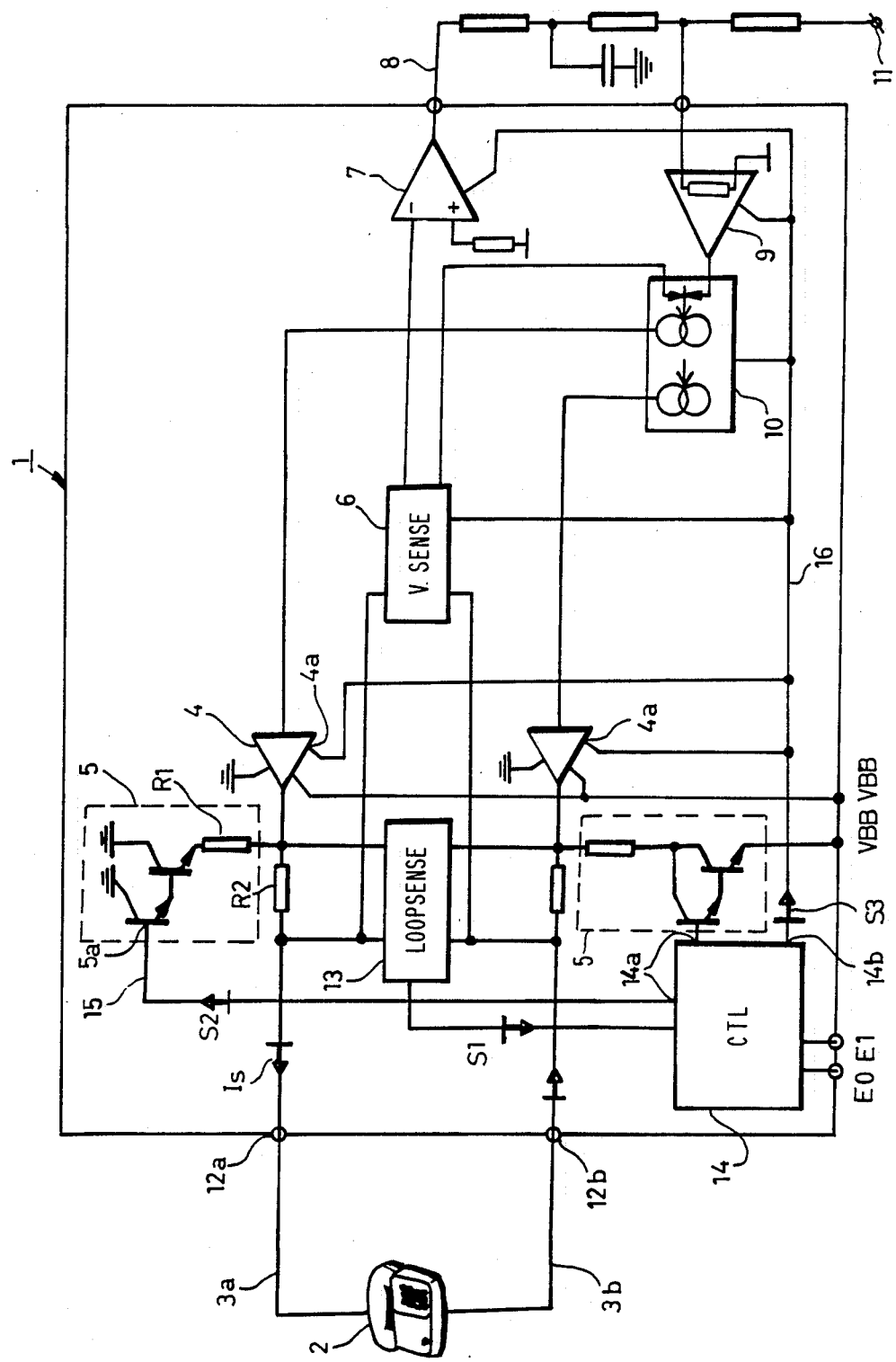

on page 1 and 2.

APPARATUS IN A TELECOMMUNICATION SYSTEM FOR SUPPLYING POWER TO A TELEPHONE SET

This application is a continuation of application Ser. No. 07/143,165, filed as PCT SE87/00219 on Apr. 28, 1987 published as WO87/07104 on Nov. 19, 1989, now abandoned.

TECHNICAL FIELD

The invention relates to an apparatus in a telecommunication system for supplying power to a telephone set, the apparatus including a line circuit with speech signal amplifiers, which are connected via a subscriber line to the telephone set and a power source connected to the speech signal amplifiers.

BACKGROUND ART

In telecommunication systems for speech transmission, the subscriber line between a telephone exchange and the subscriber's telephone set is supplied with power by amplifiers in a line circuit in the telephone exchange. The amplifiers, which must be able to transmit a speech signal, are complicated and develop relatively large idling power. In digital telephone communication systems the mentioned power supply is also active for carrying out functions in the subscriber's set even when the receiver is on its cradle. It has been proposed to equip the subscriber set with a local power supply for reducing the power development in the line circuit in the telephone exchange. This is expensive and complicated, however, and there is the risk of deteriorated function in the telecommunication system. In the U.S. Pat. No. 4,388,497 there is proposed an apparatus for reducing the power development in the line circuit. This apparatus is complicated, and the telephone set is supplied with power from two separate power sources which are respectively connected and disconnected when the subscriber lifts his receiver.

DISCLOSURE OF INVENTION

The above problems are solved in accordance with the invention by the telephone set being supplied with power from the speech signal amplifier when the receiver is lifted, and with the aid of amplifiers with low idling power when the receiver is down, and in that the amplifiers are supplied with power from a common power source.

The invention is characterized by the disclosures in the accompanying claims.

BRIEF DESCRIPTION OF DRAWINGS

An embodiment of the invention will be described in detail with reference to a FIGURE showing a block diagram of a line circuit with connected telephone set.

BEST MODE FOR CARRYING OUT THE INVENTION

In the FIGURE there is illustrated a part of a telecommunication system with a subscriber line circuit 1, which in a manner known per se is connected to a telephone set 2 at a subscriber via a subscriber line 3a, 3b. In calls, when the subscriber has lifted the receiver, the telephone set 2 is supplied via the subscriber line 3a, 3b with DC current, a line current $I_s$, by the speech signal amplifier 4. These amplifiers consume relatively great power, an idling power, apart from the power supply to the telephone set. In accordance with the invention the line circuit 1 has therefore auxiliary amplifiers 5, which are framed with dashed lines in the figure, these amplifiers supplying power to the subscriber line in a manner more closely described below, when the receiver is on it cradle. The speech signal amplifiers 4 are supplied with power from a power source (not illustrated in the figure) with a pole voltage $V_{BB}$. The voltage between the two wires 3a and 3b of the subscriber line is sensed by a voltage sensing circuit 6, the output signal of which is amplified in an amplifier 7. The latter sends its output signal via an RC-network 8 to a further amplifier 9 which in turn controls a power source 10. The power source sends current to the speech signal amplifiers 4 which are thus controlled to supply the subscriber line 3a 3b with the line current $I_s$. By sensing the voltage between the two wires 3a, 3b of the subscriber line, the line current $I_s$ can be conventionally adjusted so that it decreases with increasing resistance in the subscriber line 3a, 3b. The line current $I_s$ is sensed by unillustrated circuits in an amplifier in the telephone set 2, which enables the speech amplification in the telephone set to be adjusted to the resistance in the subscriber line 3a, 3b. A speech signal coming in on a connection 11 is transmitted by the amplifier 9 and power source 10 to the speech signal amplifiers 4 and is fed by them to the subscriber line 3a, 3b. The speech signal is attenuated by the subscriber line 3a, 3b but by the speech amplification in the telephone set it is adjusted to the resistance of the line 3a, 3b so that a desired sound level is obtained in the subscriber's telephone set 2.

In telecommunication system there are large demands made on the above-described power supply to the subscriber line and amplification of the speech signal in order that good speech transmission will be obtained. This results in that the speech signal amplifiers 4 must be made relatively complicated and have a large power consumption, idling power, apart from the power which is supplied to the telephone set 2. This idling power results in heat generation and large problems in cooling the circuit boards of the telephone exchange. To reduce these cooling problems the line circuit 1 is provided, in accordance with the invention, with auxiliary amplifiers 5, which supply power to the telephone set 2 via the subscriber line 3a, 3b with the line current $I_s$ when the subscriber's receiver is on its cradle. In accordance with the embodiment, the auxiliary amplifiers 5 each comprise two so-called Darlington-connected transistors. Their collectors have a common connection, and the emitter of a first transistor is connected to the base of the second transistor. The base of the first transistor is a control input 5a on the auxiliary amplifiers 5. The first of these auxiliary amplifiers has the common connection of the collectors connected to earth potential, and the emitter of the second transistor is connected to the subscriber line 3a via a current-restricting resistor R1 and a further resistor R2. In the second auxiliary amplifier 5 the common connection of the collectors is connected to the subscriber line 3b via the current-restricting resistor R1 and the further resistor R2. The emitter of the second transistor is connected to the pole voltage $V_{BB}$ of the above mentioned power supply. The line current $I_s$ is, a mentioned, small when the telephone receiver is on its cradle, and the voltage drop across the resistor R2 is negligible. When the receiver is lifted, the unillustrated speech circuits of the telephone set 2 are connected, and the resistance between the connections 12a and 12b of the subscriber line 3a, 3b decreases. The line current $I_s$ and the voltage drop across the two resistors R2 thus increases. This voltage drop is sensed by a loop sensing circuit 13 which is connected across the resistor R2. In the circuit 13 the voltage drops across the resistors R2 are summed and an output signal S1 assuming one of its two values is sent to a control circuit 14. This control circuit has outputs 14a connected by conductors 15 to the control inputs 5a of the auxiliary amplifiers 5. The control circuit 14 has a further output 14b connected via a control bus 16 to the control inputs 4a of the speech signal amplifiers 4, the voltage sensing circuit 6, amplifiers 7 and 9 and the power source 10. The control circuit 14 has signal inputs E0 and E1, via which extraneous signals can be connected for actuating the control circuit. In this way the control circuit can be set conventionally, e.g. for interrupting the power supply to the line circuit 1 on changing circuit boards. The control circuit 14 has signal-controlled switches which are connected to the above-mentioned outputs 14a and 14b of the control circuit. The signal controlled switches can be switched by the above-mentioned extraneous signals on the inputs E0 and E1 of the control circuit for sensing the signal S1. When the loop sensing circuit 13 sends the signal S1, according to the above, to the control circuit 14, the signal-controlled switches are reset in accordance with the invention. The base current S2 of the auxiliary amplifiers 5 is then interrupted and a control signal S3 is sent on the control bus 16. When the base current S2 is interrupted, current supply to the telephone set 2 from the auxiliary amplifiers 5 ceases. The control signal S3 switches in the speech signal amplifiers 4, the voltage sensing circuit 6, amplifiers 7 and 9 and the power source 10. The speech signal amplifiers 4 then take over power supply to the telephone set 2 and maintain the line current $I_s$ via the resistor R2 so that the voltage drop across these resistors is maintained. The speech signal amplifiers 4 will thus be connected as long as the receiver of the telephone set 2 is off its cradle. When the receiver is replaced, the speech circuit of the telephone set 2 is disconnected and the resistance between the connections 12a and 12b increases heavily. Accordingly, the line current $I_s$ through the resistor R2 decreases and the voltage sensed by the loop sensing circuit 13 decreases, the signal S1 to the control circuit 14 then assuming the second of its two values. The control circuit 14 then interrupts the control signal S3 and the base current S2 is sent to the auxiliary amplifiers 5. The speech signal amplifiers 4 are then disconnected, as well as the voltage sensing circuit 6, amplifiers 7, 9 and the power source 10, while the auxiliary amplifiers 5 supplying power to the telephone set 2 are connected.

We claim:

1. Apparatus in a telecommunication system for supplying power to a telephone set, said apparatus including a line circuit with speech signal amplifiers, which are connected via a subscriber line to the telephone set and a power source connected to the speech signal amplifiers, wherein the line circuit has auxiliary amplifiers, separate and apart from said speech signal amplifiers, connected to the subscriber line and to said power source, a loop sensing circuit connected to the subscriber line and a control circuit connected to the loop sensing circuit and to control inputs of the speech signal amplifiers and the auxiliary amplifiers and, when the receiver of the telephone set is in its lifted-off position, the loop sensing circuit senses this position and sends a corresponding signal to the control circuit which, by control signals, enables the speech signal amplifiers and disables the auxiliary amplifiers, causing the auxiliary amplifiers to present an open circuit to said subscriber line, and in that when the receiver is in its cradled position, the loop sensing circuit senses this position and sends a corresponding signal to the control circuit which, by the control signals disables the speech signals amplifiers and enables the auxiliary amplifiers so that the speech signal amplifiers, which require power, only supply power to the telephone set when the receiver is off its cradle and a call can be made.

2. Apparatus as claimed in claim 1, characterized in that the loop sensing circuit senses a line current in the subscriber line.

* * * * *